United States Patent
Fujimaru et al.

(10) Patent No.: US 6,822,010 B2
(45) Date of Patent: Nov. 23, 2004

(54) METHOD FOR PRODUCTION OF POROUS MATERIAL

(75) Inventors: Hirotama Fujimaru, Himeji (JP); Hiroki Inoue, Kyoto (JP); Kenji Kadonaga, Kakogawa (JP); Kinya Nagasuna, Nara (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/474,950

(22) PCT Filed: Apr. 16, 2002

(86) PCT No.: PCT/JP02/03769
§ 371 (c)(1),
(2), (4) Date: Oct. 14, 2003

(87) PCT Pub. No.: WO02/085956
PCT Pub. Date: Oct. 31, 2002

(65) Prior Publication Data
US 2004/0121081 A1 Jun. 24, 2004

(30) Foreign Application Priority Data
Apr. 17, 2001 (JP) ......................................... 2001-118369

(51) Int. Cl.$^7$ .................................................. C08J 9/28
(52) U.S. Cl. ......................................................... 521/64
(58) Field of Search ............................................. 521/64

(56) References Cited

U.S. PATENT DOCUMENTS

| | | | |
|---|---|---|---|
| 5,334,621 A | 8/1994 | Beshouri | 521/64 |
| 6,147,131 A | * 11/2000 | Mork et al. | 521/61 |
| 6,303,834 B1 | * 10/2001 | Mork et al. | 568/614 |

FOREIGN PATENT DOCUMENTS

| WO | WO 97/18246 | 5/1997 | C08F/2/32 |
|---|---|---|---|

* cited by examiner

*Primary Examiner*—Morton Foelak
(74) *Attorney, Agent, or Firm*—Fish & Richardson P.C.

(57) ABSTRACT

A method for producing a porous material excelling in stability of preservation is produced. A method for the production of a porous material comprising a step for obtaining a porous polymer by polymerizing an HIPE containing a polymerizable monomer is disclosed, which method comprises a step for adding a compound capable of reacting with a polymerization initiator and/or a compound capable of reacting with an unsaturated double bond to said emulsion, said porous polymer and/or said porous material having a conversion of not less than 70%. According to this invention, it is made possible to produce a porous material excelling in stability in storage and to decrease the polymerization initiator and the residual monomer very simply.

15 Claims, 1 Drawing Sheet

METHOD FOR PRODUCTION OF POROUS MATERIAL

TECHNICAL FIELD

This invention relates to a method for the production of a porous material by the polymerization of a water-in-oil type high internal phase emulsion (hereinafter referred to as "HIPE"), which is enabled by adding at the step of production a compound capable of reacting with a polymerization initiator and/or a compound capable of reacting with an unsaturated double bond in order to maintain the quality thereof stably for a long time and to excel in the ability.

BACKGROUND ART

As a technique for obtaining a porous material formed of continuous open cells having a fine and uniform diameter, which comprises forming an HIPE in the presence of a specific surfactant and then obtaining a polymer of the HIPE has been known. The term "HIPE" as used herein is generally known as an emulsion of such a quality that the dispersed phase thereof is exceeding 70 vol. % of the whole volume of the emulsion. The official gazette of U.S. Pat. No. 5,334,621, for example, discloses a method for producing a porous material by the HIPE, which method is subjected a polymerizable monomer contained in such an HIPE to cross-linking polymerization.

The HIPE is prepared, for example, from (i) a polymerizable monomer mixture composed of an oil-soluble vinyl monomer and a cross-linking monomer possessing not less than two functional groups in the molecular unit thereof, (ii) a water phase being 90 wt %, preferably 95 wt %, and particularly preferably 97 wt % of the total amount of the emulsion, (iii) a surfactant such as, for example, the sorbitan fatty acid ester or the glycerol monofatty acid ester, and (iv) a polymerization initiator. The porous material can be produced by heating, polymerization and cross-linking the HIPE. The porous material produced by this HIPE method is composed of continuous open cells forming a reticular pattern. The porous material obtained by the HIPE method, therefore, has such characteristic properties as low density, water absorbing property and water retaining property, heat insulating property, and sound insulating property. It can be used as absorbents for sanitary materials such as disposable diapers and sanitary napkins, as sound insulators and heat insulators for absorbing sound and heat, and as bases for impregnation with aromatic materials and detergents. It can further be used as absorbents for oils and organic solvents.

For the purpose of producing the porous material by the HIPE method with satisfactory commercial productivity, it is necessary that the relevant reaction be completed quickly. Thus, the reaction prefers use of a polymerization initiator in a comparatively large amount, but the obtained porous material is found to incur the problem that the properties thereof are changed by age. Specifically, the speed of water absorption, the absorbent capacity, and the strength of material which are required to the porous material as product properties show a discernible sign of change by age after standing at rest under specific conditions.

The fact that the porous material properties change during the course of protracted storage, when considered on the assumption that the porous material is used as the absorbent for a sanitary material, for example, means that the performance of a disposable diaper or a sanitary napkin varies with the elapse of time. This is not agreeable.

Further, when the porous material is quickly obtained by using the polymerization initiator in a comparatively large amount as described above, it possibly suffers persistence of the polymerization initiator or the monomer therein. From the viewpoint of safety, the porous material is preferred to have such residual components diminished.

Heretofore, the method for washing the porous polymer obtained by polymerizing the HIPE has been known. When this method is applied in an effort to diminish the residual polymerization initiator or the residual monomer, however, the amount of the water to be used for the washing reaches several times to some tens of times and, under the worst conditions, some hundreds of times as large as the amount of the porous material and the process of washing becomes proportionately complicated. The disposal of the washings also requires an extra process and eventually boosts the cost of production greatly.

No method has been heretofore known to be capable of producing such a porous material as encountering no change by age, maintaining performance stably, and excelling in safety by a process of satisfactorily high productivity without entailing any complicated step.

DISCLOSURE OF THE INVENTION

The present inventors, after pursuing a study in search of a process for producing a porous material by the HIPE method, have found that a porous material exhibiting an excellent shelf life and possessing a satisfactory water absorbing property is obtained by adding a compound capable of reacting with a polymerization initiator and/or a compound capable of reacting with an unsaturated double bond to the HIPE, the porous polymer, or the porous material at a specific stage of polymerization and that a porous material having a residual polymerization initiator and a residual monomer only at low levels and excelling in safety is obtained without undergoing a complicated process such as the washing step. This invention has been perfected as a result.

According to this invention, by adding a compound capable of decomposing a polymerization initiator and/or a compound capable of reacting with an unsaturated double bond at the step of production of the porous material, it is made possible to exalt immensely the stability of the porous material in storage and diminish the amounts of the residual polymerization initiator and residual monomer in the product as well.

BEST MODE OF EMBODYING THE INVENTION

Figure 1:
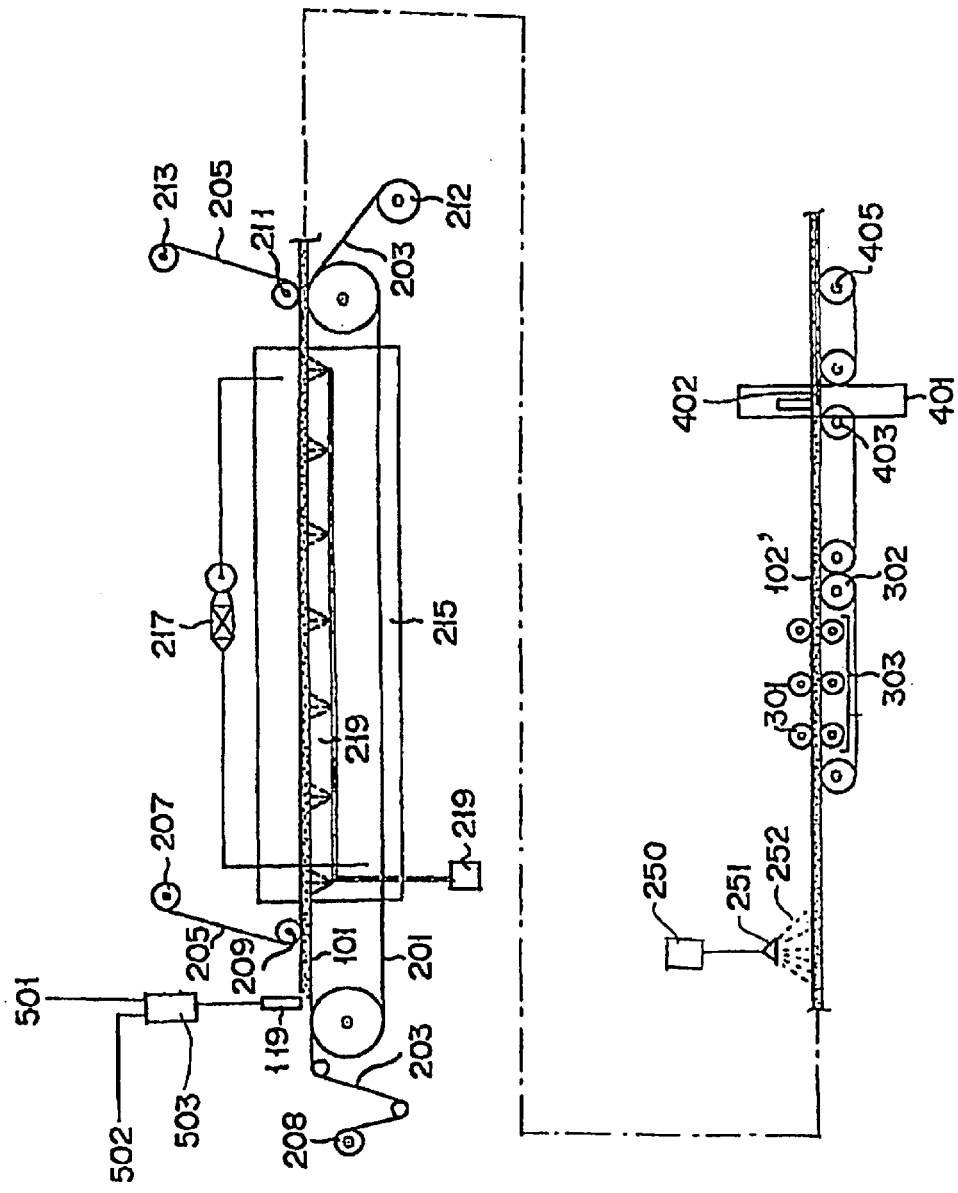
FIG. 1 is a schematic side view depicting a typical mode of embodying a proper apparatus for continuous polymerization for use in the method of this invention for the production of a porous material.

This invention primarily concerns a method for the production of a porous material comprising a step for obtaining a porous polymer by polymerizing an HIPE containing a polymerizable monomer, which comprises a step for adding a compound capable of reacting with a polymerization initiator and/or a compound capable of reacting with an unsaturated double bond to said emulsion, said porous polymer and/or said porous material having a conversion of not less than 70%. Incidentally, "Conversion" is defined as a ratio of an amount of monomer polymerized in the process of porous material by weight to an amount of monomer included in the HIPE by weight. As a specific mode, the method for producing the porous material comprises (a) a step for forming the HIPE, (b) a step for obtaining a porous polymer by polymerizing the HIPE, and (c) a step for obtaining a porous material by dehydrating the porous polymer in the order and further includes, subsequently to not earlier than the aforementioned step (b), a step for adding a compound capable of reacting with a polymerization initiator and/or a compound capable of reacting with an unsaturated double bond to the HIPE, the porous polymer mentioned above and/or obtained porous material having a conversion of not less than 70%.

The present inventors, after making an elaborate study in search of the cause for the change manifested by the porous material properties, have found that the problem mentioned above is solved by adding a compound capable of reacting with the polymerization initiator contained in the HIPE and/or a compound capable of reacting with an unsaturated double bond contained in the HIPE to the emulsion, the porous polymer and/or the porous material having not less than a specific conversion. Though the mechanism which underlies the solution of the problem has not been fully elucidated, this solution of the problem may be logically explained by supposing that the added compounds repress the reactions of the polymerization initiator persisting during the course of protracted storage and the residual polymerizable monomer (residual monomer), thereby degenerating the change of the skeleton and the surface of the porous material. By the addition of these compounds, therefore, it is made possible to produce the porous material which incurs only a very small change by age and excels in stability during storage. This invention is at a great advantage in obviating the necessity for a large-scale apparatus from the standpoint of process.

One example of the mode of continuously producing a porous material by spraying a reducing agent on a porous polymer will be explained below with reference to the flow diagram of FIG. 1. With reference to FIG. 1, an HIPE 101 is formed by introducing an oil phase 501 and a water phase 502 into an emulsifying device 503. The HIPE 101 is continuously supplied from an HIPE supplying part 119 onto a sheet material 203 and formed in the shape of a sheet of a prescribed thickness by adjusting the set height of a roller 209. The rotating speeds of an unwinding and a winding roller 208 and 212 are controlled so as to synchronize the sheet material 203 and a conveyor belt 201. The rotating speed of a sheet material 205 is controlled as kept under tension by the rollers 209 and 211 and an unwinding and a winding roller 207 and 213 so as to fix the thickness of the HIPE 101. By a temperature elevating means 219 which is a hot water shower disposed below the conveyor 201 and a temperature elevating means 217 formed of a hot wind circulating device disposed above the conveyor, the HIPE 101 is polymerized in a polymerizing furnace 215 to obtain a porous polymer 102.

Subsequently, to the surfaces of the porous polymer 102 which have been stripped of the upper and lower sheet materials 203 and 205, a reducing substance 252 is sprayed through a leading terminal nozzle 251 of a reducing substance supplying means 250. Then, the porous polymer 102 is mounted on a belt being rotated with a conveyor 302 driven by the roll of the dehydrating device 303, nipped between compressing rolls 301 disposed upward and downward positions across the belt, and dehydrated by the rotation of the rolls. Incidentally, a dehydrated porous material 102' may be transferred to an endless band knife type slicer 401 disposed as continued thereto and sliced in the direction of thickness with a band knife 402. Now, this invention will be described in detail below.

[I] Raw Material Used for HIPE

The raw material for the HIPE has only to contain (a) a polymerizable monomer (hereinafter occasionally referred to simply as "monomer"), (b) a cross-linking monomer, and (c) a surfactant as essential component for forming an oil phase and (d) water as an essential component for forming a water phase. It may further contain, as occasion demands, (e) a polymerization initiator, (f) a salt, and (g) other additives as arbitrary component for forming an oil phase and/or a water phase.

(a) Polymerizable Monomer

The monomer mentioned above has only to possess one polymerizable unsaturated group in the molecular unit thereof. It does not need to be particularly limited so long as it is dispersible, polymerizing in the HIPE, or capable of forming bubbles. At least part of the monomer contains preferably a (meth)acrylic ester, more preferably not less than 20 weight % of the (meth)acrylic ester, and particularly preferably not less than 35 weight % of the (meth)acrylic ester. The fact that the monomer contains the (meth)acrylic ester is advantageous because it permits the produced porous material to abound in flexibility and toughness.

As concrete examples of the monomer, allylene monomers such as styrene; monoalkyleneallylene monomers such as ethyl styrene, .-methylstyrene, vinyl toluene, and vinylethyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These monomers may be used either singly or in the form of a mixture of two or more members.

The amount of the monomer to be used is preferred to be in the range of 10–99.9 weight %, based on the total weight of the monomer component composed of the monomer mentioned above and the cross-linking monomer to be indicated below. The reason for this particular range is that the monomer used in such an amount permits production of a porous material having a fine pore diameter. The amount is more preferably in the range of 30–99 weight % and particularly preferably in the range of 30–70 weight %. If the amount of the monomer to be used falls short of 10 weight %, the shortage will be at a disadvantage in suffering the produced porous material to become unduly brittle and to manifest an insufficient absorbent capacity. Conversely, if the amount of the monomer exceeds 99.9 weight %, the excess will be at a disadvantage in suffering the produced porous material to reveal deficiency in strength and elastic recovery and fail to secure a sufficient absorbent capacity and a sufficient speed of water absorption.

(b) Cross-Linking Monomer

The cross-linking monomer mentioned above has only to possess at least two polymerizable unsaturated groups in the molecular unit thereof. Similarly to the polymerizable monomer mentioned above, it does not need to be particularly limited so long as it is dispersible, polymerizable in the HIPE, and capable of forming bubbles.

As concrete examples of the cross-linking monomer, aromatic monomers such as divinyl benzene, trivinyl benzene, divinyl toluene, divinyl xylene, p-ethyl-divinyl benzene, divinyl alkyl benzenes, divinyl naphthalene, divinyl phenanthrene, divinyl biphenyl, divinyl diphenyl methane, divnyl benzyl, divinylphenyl ether, and divinyldiphenyl sulfide; oxygen-containing monomers such as divinyl furan; sulfur-containing monomers such as divinyl sulfide and divinyl sulfone; aliphatic monomers such as butadiene, isoprene, and pentadiene; and ester compounds of polyhydric alcohols and acrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth) acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri(meth)acrylate, pentaerythritol di(meth) acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra (meth)acrylate, N,N'-methylenebis(meth)acrylamide, triallyl isocyanurate, triallyl amine, tetra-allyloxy ethane, hydroquinone, catechol, resorcinol, and sorbitol may be cited. These cross-linking monomers may be used either singly or in the form of a mixture of two or more members.

The amount of the cross-linking monomer to be used is preferred to be in the range of 0.1–90 weight %, based on the total weight of the monomer component composed of the polymerizable monomer mentioned previously and the cross-linking monomer mentioned above. It is more preferably in the range of 1–70 weight % and particularly preferably in the range of 30–70 weight %. If the amount of the cross-linking monomer to be used falls short of 0.1 weight %, the shortage will be at a disadvantage in suffering the produced porous material to reveal deficiency in strength, elastic recovery, and absorbent capacity per unit volume or unit weight and in failing to secure fully satisfactory absorbent capacity and speed of absorption. Conversely, if the amount of the cross-linking monomer to be used exceeds 90 weight %, the excess will be at a disadvantage in suffering the porous material to become brittle and deficient in the absorbent capacity.

(c) Surfactant

The surfactant mentioned above imposes no particular limit so long as it is capable of emulsifying a water phase in an oil phase in the construction of the HIPE. It may be selected from among known nonionic surfactants, cationic surfactants, anionic surfactants, and amphoteric surfactants.

As concrete examples of the nonionic surfactant, nonylphenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monoleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkyl aryl ethers such as polyoxy-ethylene nonyl phenyl ether; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as polyoxyethylene sorbitol tetraoleate; polyoxyethylene fatty acid esters such as polyethylene glycol monolaurate, polyethylene glycol monostearate, polyethylene glycol distearate, and polyethylene glycol monooleate; polyoxyethylene alkyl amines; polyoxyethylene cured castor oil; and alkyl alkanol amides may be cited. These nonionic surfactants particularly have HLB values not higher than 10, preferably falling in the range of 2–6. Two or more of these nonionic surfactants may be used in combination. The combined use possibly improves the HIPE in stability.

The cationic surfactants which are usable herein include quaternary ammonium salts such as stearyl trimethyl ammonium chloride, ditallow dimethyl ammonium methyl sulfate, cetyl trimethyl ammonium chloride, distearyl dimethyl ammonium chloride, lauryl trimethyl ammonium chloride, and alkylbenzyl dimethyl ammonium chlorides; alkyl amine salts such as coconut amine acetate and stearyl amine acetate; alkyl betaines such as lauryl betaine, stearyl betaine, and lauryl carboxymethyl hydroxyethyl imidazolinium betaine; and amine oxides such as lauryl dimethylamine oxide, for example. When the produced porous material is utilized as an absorbent, the use of such a cationic surfactant may possibly result in imparting an outstanding antibacterial property to the absorbent.

The anionic surfactant can be used advantageously particularly when it is possessed of an anionic moiety and an oil-soluble moiety. As concrete examples of the anionic surfactant, alkyl sulfates such as sodium dodecyl sulfate; potassium dodecyl sulfate, and ammonium alkyl sulfates; sodium dodecyl polyglycol ether sulfate; sodium sulforicinoate; alkyl sulfonates such as paraffin sulfonate; alkyl sulfonates such as sodium dodecyl benzene sulfonate and alkali metal sulfates of alkaliphenol hydroxyethylene; higher alkyl naphthalene sulfonates; fatty acid salts such as naphthalene sulfonic acid formalin condensate, sodium laurate, triethanol amine oleate, and triethanol amine laurate; polyoxyalkyl ether sulfuric acid esters; polyoxyethylene carboxylic acid ester sulfuric esters and polyoxyethylene phenyl ether sulfuric esters; succinic dialkyl ester sulfonates; and reactive anion emulsifiers possessing a double bond such as polyoxyethylene alkyl aryl sulfates may be cited. The HIPE may be prepared by using an anionic surfactant in combination with a cationic surfactant.

Incidentally, the combined use of a nonionic surfactant and a cationic surfactant possibly results in improving the HIPE in stability.

The amount of the surf actant mentioned above to be used is preferably in the range of 1–30 parts by weight and more preferably in the range of 3–15 parts by weight, based on 100 parts by weight of the monomer component composed of a polymerizable monomer and a cross-linking monomer. If the amount of the surfactant to be used falls short of 1 part by weight, the shortage will be at a disadvantage in rendering the dispersibility of the HIPE unstable or preventing the action and effect inherent in the surfactant from being fully manifested. Conversely, if the amount of the surfactant to be used exceeds 30 parts by weight, the excess will be at a disadvantage in rendering the produced porous material excessively brittle and in being wasted without bringing a proportionate addition to the expected effect.

(d) Water

The water mentioned above may be tap water, purified water, deionized water, the waste water emanating from the plant used for the production of the porous material, or the waste water which has undergone a prescribed treatment. The amount of the water to be used can be suitably selected, depending on the type of application found for the porous material furnished with open cells such as, for example, absorbent, sanitary material, oil absorbent, sound absorbent, or filter.

(e) Polymerization Initiator

The polymerization initiator is used for the purpose of accomplishing the polymerization of the HIPE in a very short period of time as aimed at by this invention. This polymerization initiator may be any of the polymerization initiators which are usable for reverse-phase emulsion polymerization. This invention does not need to discriminate the polymerization initiator between the water-soluble type and the oil-soluble type.

As concrete examples of the water-soluble polymerization initiator, azo compounds such as 2,2'-azobis(2-amidinopropane) dihydrochloride; persulfates such as ammonium persulfate, potassium persulfate, and sodium persulfate; and peroxides such as potassium peracetate, sodium peracetate, potassium percarbonate, sodium percarbonate, and hydrogen peroxide may be cited.

As concrete examples of the oil-soluble polymerization initiator, peroxides such as cumene hydroperoxide, t-butyl hydroperoxide, t-butyl peroxy-2-ethylhexanoate, di-t-butyl peroxide, diisopropyl benzene hydroperoxide, p-menthane hydroperoxide, 1,1,3,3-tetramethyl butyl hydroperoxide, 2,5-dimethylhexane-2,5-dihydroxyperoxide, benzoyl peroxide, and methylethyl ketone peroxide may be cited.

These polymerization initiators may be used either singly or in the form of a mixture of two or more members. It is advantageous to use in combination two or more such polymerization initiators which have different 10-hour half life temperatures, i.e. the temperatures at which the concentration is halved in ten hours. As a matter of course, it is permissible to use in combination a water-soluble polymerization initiator and an oil-soluble polymerization initiator.

The amount of the polymerization initiator to be used in the reverse-phase emulsion polymerization mentioned above, though variable with the particular combination of a monomer component and a polymerization initiator mentioned above, is preferably in the range of 0.05–25 parts by weight, and more preferably in the range of 1.0–25 parts by weight, based on 100 parts by weight of the monomer component composed of the polymerization monomer and the cross-linking monomer. If the amount of the polymerization initiator to be used falls short of 0.05 part by weight, the shortage will be at a disadvantage in increasing the amount of the unaltered monomer component and consequently increasing the amount of the residual monomer in the produced porous material. Conversely, if the amount of the polymerization initiator exceeds 25 parts by weight, the excess will be at a disadvantage in rendering the control of polymerization difficult and degrading the mechanical property of the produced porous material.

It is further permissible to use the redox polymerization initiator which is formed by combining the polymerization initiator mentioned above with a reducing agent. The redox polymerization initiator allows the presence therein of the reducing agent besides the peroxide as the polymerization initiator. When the reducing agent and the peroxide are together added, the redox reaction occurring between the two components gives rise to an active free group and sets the polymerization proceeding. The polymerization initiator to be used in this case may be either the water-soluble type or the oil-soluble type, whichever suits the occasion better. It is permissible to use a water-soluble redox polymerization initiator and an oil-soluble redox polymerization initiator in combination. Specifically, the following reducing agent is used in combination with the peroxide mentioned above.

Of the reducing agents mentioned above, the water-soluble reducing agents include thiosulfates such as sodium hydrogen thiosulfate, thiosulfuric acid, sodium thiosulfate, and potassium thiosulfate, dithionous acid and salts thereof, L-ascorbates such as L-ascorbic acid and sodium L-ascorbate, erysorbates such as erysorbic acid and sodium erysorbate, divalent iron salts such as iron II oxalate, iron II sulfate, iron II lactate, iron II chloride, ferric chloride, and ammonium ferrous sulfate (Mohr's salt), and monovalent copper salts such as copper I chloride, copper I bromide, copper I iodide, copper I sulfate, copper suboxide, and copper I cyanide, for example. Formaldehyde, formaldehyde sodium sulfoxylate, glucose, dextrose, triethanol amine, diethanol amine, and oxalic acid may be cited other concrete examples of the water-soluble reducing agent. The oil-soluble reducing agents include organic amine compounds such as dimethyl aniline, aniline, and p-phenylene diamine and transition metal salts of organic acids such as tin octylic acid and cobalt naphthelic acid, for example. These reducing agents for the redox polymerization initiator may be used either singly or in the form of a mixture of two or more members.

The inclusion ratio of the reducing agent (weight ratio) in the redox polymerization initiator mentioned above, i.e. polymerization initiator (oxidizing agent)/reducing agent, is approximately in the range of 1/0.01–1/10, preferably in the range of 1/0.2–1/5. The redox polymerization initiator, incidentally, is known in two types; i.e. the type formed by first adding a reducing agent and then adding a peroxide and the type formed by first adding a peroxide and then adding a reducing agent. This invention does not need to discriminate between these two types. This invention manifests its effect better when it uses a peroxide as the polymerization initiator.

(f) Salt

The salt mentioned above may be used when it is required for the purpose of improving the HIPE in stability.

As concrete examples of the salt, halogenides, sulfates, nitrates, and other water-soluble salts of such alkali metals and alkaline earth metals as calcium chloride, sodium sulfate, sodium chloride, and magnesium sulfate may be cited. These salts may be used either singly or in the form of a mixture of two or more members. The salt is preferred to be added to the water phase. Among other salts cited above, the polyvalent metal salt proves particularly advantageous from the standpoint of the stability of the HIPE during the course of polymerization.

The amount of the salt to be used is preferably in the range of 0.1–20 parts by weight and more preferably in the range of 0.5–10 parts by weight. If the amount of the salt to be used exceeds 20 parts by weight, the excess will be at a disadvantage in suffering the waste water squeezed out of the HIPE to contain an unduly large amount of the salt and consequently require an extra treatment for the sake of safe disposal and in being wasted without bringing a proportionate addition to the effect expected. If the amount of the salt to be used falls short of 0.1 part by weight, the shortage will be at a disadvantage in possibly preventing the function and effect of the addition of the salt from being manifested fully satisfactorily.

(g) Other Additive

When other varying additive results in improving the conditions of production, the characteristic properties of the produced HIPE, and the performance of the porous material on account of the performance and function which is inherent therein, it may be properly used. For the purpose of the adjustment of pH, for example, a base and/or a buffer may be added. The amount of such other additive to be used has only to fall in a range such that the additive so added may manifest fully the performance and function and economy as well which satisfy the purpose of addition. As concrete examples of the additive, activated carbon, inorganic powder, organic powder, metal powder, deodorant, antibacterial agent, mildew proofing agent, perfume, and various macromolecules may be cited.

[II] Step for Forming HIPE

The method for forming the HIPE does not need to be particularly limited but may be properly selected from among the heretofore known methods for the formation of the HIPE and put to use. Now, typical methods for the formation will be described specifically below.

(a) Apparatus for Production of HIPE

The apparatus for forming the HIPE does not need to be particularly limited but may be properly selected from among the heretofore known apparatuses for production and put to use. As the stirrer (emulsifier) to be used for mixing and stirring a water phase and an oil phase, for example, may be selected from among the known stirrers and kneaders. As concrete examples of the stirrer, stirrers fitted with propeller type, paddle type, and turbine type vanes and line mixers and pin mixers may be cited.

(b) Mixing of Raw Materials of HIPE

Generally, a component composed of at least a polymerizable monomer, a cross-linking monomer, and a surfactant and destined to form an oil phase is stirred at a prescribed temperature to prepare a homogeneous oil phase. The emulsifying device is charged with this oil phase. Meanwhile, water and an optionally added component formed of a salt and destined to form a water phase are together stirred simultaneously with the continuation of the addition and heated at a prescribed temperature in the range of 30–95° C. to prepare a homogeneous water phase. The emulsifying device is charged with this water phase. The ensuant contents of the emulsifying device are mixed and stirred efficiently at a prescribed temperature which will be specifically described herein below and subjected to proper shear force and emulsified to attain stable formation of the HIPE. The water phase and the oil phase to be used for the formation of the HIPE, when necessary, may incorporate therein other components.

(c) Temperature for Formation of HIPE

The temperature for forming the HIPE (hereinafter occasionally referred to as "emulsifying temperature") is in the range of 70–110° C. and preferably in the range of 80–110° C. If the temperature for the formation of the HIPE falls short of 70° C., the shortage will be at a disadvantage in requiring an unduly long time for heating, depending on the curing temperature. Conversely, if the temperature for the formation of the HIPE exceeds 110° C., the excess will be at a disadvantage in suffering the formed HIPE to reveal deficiency in stability. The term "emulsifying temperature" as used in the present specification refers to the temperature of the HIPE at which the HIPE is caused by the addition of a polymerization initiator to start polymerizing. Thus, the temperatures of the water phase and the oil phase do not need to remain constantly in the range of 70–110° C. during the course of the preparation of the HIPE. It is, therefore, permissible to have the temperatures of the oil phase and/or the water phase adjusted in advance to a prescribed emulsifying temperature and then stir and mix the two phases till they are emulsified and eventually made to form an HIPE having a temperature in the range mentioned above.

(d) Water Phase/Oil Phase (W/O) Ratio

The water phase/oil phase (W/O) ratio (weight ratio) of the HIPE consequently obtained does not need to be particularly limited but may be properly selected, depending on the type of application found for the porous material possessing open cells (such as, for example, water absorbent, oil absorbent, sound absorbent, or filter). Specifically, this ratio properly is not less than 3/1 and preferably falls in the range of 10/2–250/1 and particularly in the range of 10/1–100/1. If the W/O ratio falls short of 3/1, the shortage will be at a disadvantage in suffering the porous material to manifest only an insufficient ability to absorb water and energy and unduly low degree of opening and also suffering the surface of the produced porous material to possess only an insufficient degree of opening and possibly fail to acquire a sufficient permeability to liquid. By varying the W/O ratio, however, the void ratio of the porous material is determined. The W/O ratio, therefore, is preferred to be so selected that the void ratio may conform to the type and object of the application. When the porous material is used as a varying absorbent such as disposable diaper or sanitary material, for example, the W/O ratio is preferred to be in the approximate range of 10/1–100/1. The HIPE which is obtained by stirring and mixing the water phase and the oil phase is generally a white highly viscous emulsion.

(e) Addition of Polymerization Initiator

The HIPE starts polymerizing after addition thereto of a polymerization initiator. In this invention, the polymerization initiator is added to the HIPE which has a temperature of not lower than 70° C. to attain the start of polymerization. From the viewpoint of the stability of the HIPE, therefore, the polymerization initiator is preferred to be added after the HIPE has been formed at the prescribed temperature.

As the polymerization initiator, an oxidizing agent and a reducing agent may be possibly used in combination as found in the composition of the redox type initiator. In this case, the polymerization is promoted particularly after the two agents have been mixed. The expression "addition of polymerization initiator" as used in the present specification, when the polymerization initiator uses two or more compounds in combination, means the fact that the plurality of compounds have been added. When the redox polymerization initiator is used as the polymerization initiator, it is preferred to form the HIPE by adding a reducing agent in advance to an oil phase and/or a water phase, adjust the HIPE to a prescribed temperature, and thereafter adding a peroxide thereto.

The porous material can be produced continuously and quickly by heightening the emulsion temperature and the polymerization temperature. When the emulsion temperature is high, the polymerization is immediately initiated by the addition of the polymerization initiator. In this invention, therefore, the reducing agent or the oxidizing agent or other component of the polymerization initiator is added to the HIPE via an inlet port disposed in the path leading from the emulsifying device for forming the HIPE to the polymerization vessel or the polymerizing device and the HIPE and the added component are mixed in a line mixer. By this procedure, the possible gelation in the emulsifying device can be prevented. The kind of the polymerization initiator to be added to the HIPE in this case is irrelevant. Besides the case of adding an oil-soluble or water-soluble polymerization initiator through the path mentioned above, therefore, the method which comprises adding a peroxide during the formation of the HIPE and thereafter adding a water-soluble reducing agent through the path leading from the emulsifying device to the polymerizing device proved effective depending on the kind of polymerization initiator to be used. The combination of sodium persulfate and L-ascorbic acid may be cited as one example of this particular mode of addition.

The polymerization initiator may be used in an undiluted form or in the form of a solution or dispersion in water or an organic solvent. The polymerization initiator or the redox type polymerization initiator is added efficiently to the HIPE in the form of a solution in an oily solvent when the reducing agent in the initiator is soluble in oil or in the form of a solution in an aqueous solvent when the reducing agent is soluble in water.

[III] Step for Obtaining Porous Polymer (a) Formation and Polymerization of HIPE This invention, in formation and polymerizing the HIPE, may adopt the "continuous process" which continuously performs a step of supplying a water phase and an oil phase to an emulsifying device and forming the HIPE therein, a step of polymerizing the formed HIPE thereby obtaining a porous polymer, and a step of thereafter dehydrating the porous polymer or the "batchwise process" which comprises a step of supplying a water phase and an oil phase in proper amounts to an emulsifying device and forming a porous polymer by use of the HIPE contained in the emulsifying device and subsequently dehydrating the porous polymer. The method for continuously polymerizing the HIPE proves advantageously in respect that the efficiency of production is high and that the effect of curtailing the polymerization time and the effect of decreasing the size of the polymerization apparatus can be utilized most effectively. That is, the step of forming the HIPE, the step of obtaining the porous polymer, and the step of obtaining porous material are preferred to proceed continuously.

Specifically, for the continuous polymerization of the sheetlike porous polymer, the method which comprises continuously supplying the HIPE onto a running belt of a belt conveyor so constructed as to have the belt surface heated with a heating device, imparting the shape of a flat smooth sheet to the HIPE on the belt and meanwhile polymerizing the shaped HIPE by application of heat is available. When the conveyor has a flat and smooth surface for contact with the HIPE, it is made possible to obtain a continuous sheet of an expected thickness by supplying the HIPE in a prescribed thickness onto the belt.

For the production of a porous polymer in a three-dimensional cubic shape, the cast polymerization, namely the method which comprises casting the HIPE in a mold of the shape mentioned above and polymerizing the HIPE in the mold, is available. Incidentally, the cast polymerization may be effected by the batchwise process or the continuous process using a running series of molds.

(b) Apparatus for Polymerization of HIPE

The apparatus for polymerization which can be used in this invention does not need to be particularly limited but may be selected from among belt conveyor type continuous polymerizing devices and continuous cast polymerizing devices which are provided with a temperature adjusting means. It is naturally permissible to use a batch type polymerizing device or a batch type casting polymerizing device.

(c) Polymerizing Temperature

The HIPE can be polymerized by a conventionally known method. By supplying the HIPE to the polymerizing device mentioned above and heating it therein, therefore, it is made possible to obtain a porous polymer.

The HIPE contemplated by this invention is properly heated at a temperature in the range of room temperature $-150°$ C. From the viewpoint of the stability and the polymerization speed of HIPE, the temperature is preferably in the range of 70–150° C., more preferably in the range of 80–130° C., and particularly preferably in the range of 90–110° C. If the polymerizing temperature falls short of the room temperature, the shortage will be at a disadvantage in requiring an unduly long time for polymerization and rendering commercial production unfavorable. Conversely, if the polymerization temperature exceeds 150° C., the excess will be at a disadvantage in suffering the produced porous material to reveal lack of uniformity of pore diameter and decline of strength. The polymerizing temperature may be allowed to vary in two stages or in more stages during the course of polymerization. This invention does not need to exclude this mode of performing the polymerization.

(d) Time for Polymerization

The time for polymerizing the HIPE is in the range of one minute–20 hours. It is preferably within one hour, more preferably within 30 minutes, and particularly preferably in the range of 1–20 minutes. Particularly, since the polymerization is performed after the impartation of the shape and the improvement of the polymerizing tank in efficiency, therefore, can be promoted after the impartation of shape, the length of the pedestal for polymerization in the continuous production of a sheetlike article can be decreased by shortening the time for polymerization. If the time falls short of one minute, the shortage will be at a disadvantage in conferring no sufficient strength on the porous material. Naturally, this invention does not need to exclude the adoption of a longer time for polymerization than the upper limit of the range mentioned above. After the polymerization, the HIPE is cooled or left cooling to a prescribed temperature. Optionally, the polymerized porous material may be subjected to such a step of aftertreatment as dehydration or compression without being cooled beforehand.

The term "time for polymerization" as used herein refers to the total duration from the time the shaped HIPE enters the polymerizing furnace till the time it departs from the polymerization furnace. This invention imposes no particular limit on this duration. The time for polymerization of the HIPE of this invention, however, is within one hour, preferably within 30 minutes, more preferably in the range of 1–30 minutes, and particularly preferably in the range of 1–10 minutes. If the time for polymerization exceeds one hour, the excess will be at a disadvantage in degrading productivity possibly to a commercially intolerable extent. Conversely, if the time falls short of one minute, the shortage will be at a disadvantage in suffering the porous material to reveal deficiency in strength. Naturally, this invention does not need to exclude the adoption of a longer time for polymerization than the upper limit of the range mentioned above.

[IV] Step for Dehydration of Porous Polymer

The porous polymer which is formed in consequence of the completion of polymerization is generally dehydrated by compression, aspiration under reduced pressure, or the combination thereof and converted into a porous material. By this dehydration, the portion, 50–98 weight %, of the used water is removed from the porous polymer and the remainder thereof persists as deposited fast on the porous material.

The ratio of dehydration is properly set depending on the purpose of application of the porous material. Generally, it suffices to set this ratio of dehydration so that the porous material in a perfectly dry state may have a water content in the range of 1–10 g and preferably in the range of 1–5 g, per g of the porous material.

The waste water obtained at this step of dehydration may be reused for the formation of the HIPE. The water which has been used for the formation of the water phase of the HIPE and the water component which is generated while the porous material is being dried may be also used as the waste water.

[V] Addition of Compound Capable of Reacting with Polymerization Initiator and/or Compound Capable of Reacting with an Unsaturated Double Bond This invention contemplates adding a compound capable of reacting with the polymerization initiator and/or a compound capable of reacting with an unsaturated double bond at or after the step for obtaining a porous polymer by polymerizing the HIPE mentioned above, namely either during or after the step mentioned above. To be specific, this invention is characterized by adding a compound capable of reacting a polymerization initiator and/or a compound capable of reacting with an unsaturated double bond to at least one selected from the group consisting of an HIPE, porous polymer and porous material having a conversion of not less than 70%.

(a) Compound Capable of Reacting with Polymerization Initiator

The compound which is capable of reacting with the polymerization initiator to be used in this invention has only to be a compound which allays the action of a polymerization initiator without reference to the mechanism of the action of the polymerization or which can react with the compound. When a peroxide has been used as a polymerization initiator, therefore, a reducing agent is used as the compound under discussion. The reducing agent may be either a water-soluble reducing agent or an oil-soluble reducing agent, whichever better fits the occasion.

As concrete examples of the water-soluble reducing agent, sodium hydrogen sulfite, thiosulfuric acid and thiosulfates such as sodium thiosulfate and potassium thiosulfate, dithionous acid and salts thereof, L-ascorbic acid and L-ascorbates such as sodium L-ascorbate, erysorbic acid, erysorbates such as sodium erysorbate, divalent iron salts such as iron II oxalate, iron II sulfate, iron II lactate, iron II chloride, and ammonium ferrous sulfate (Hohrs' salt), monovalent copper salts such as copper I chloride, copper I bromide, copper I iodide, copper I sulfate, copper oxide, and copper I cyanide, formaldehyde, formaldehyde sodium sulfoxylate, glucose, dextrose, triethanolamine, diethanol amine, and oxalic acid may be cited. As concrete examples of the oil-soluble reducing agent, organic amine compounds such as aniline, dimethyl aniline, and P-phenylene diamine and transient metal salts of organic acids such as tin octylate and cobalt naphthenate may be cited. These reducing agents may be used either singly or in the form of a combination of two or more members.

Particularly, the polymerization initiator which is contained in an excess amount can be inactivated with a reducing substance. When a redox type polymerization initiator is used as the agent for initiating the polymerization of the HIPE, for example, it is common to add to the HIPE a peroxide in a larger amount than the reducing agent added in advance. Thus, in addition to the water contained in the HIPE and the porous polymer and the polymerization initiator, the polymerization initiator possibly persists in or adheres to the porous material which has been dehydrated. In this case, the addition of a reducing substance results in imparting to the produced porous material such stability as to resist the effect of aging.

(b) Compound Capable of Reacting with Unsaturated Double Bond

As concrete examples of the compound which can react with an unsaturated double bond, amino group-containing compounds such as ammonia, ammonia sats, alkyl amines and salts thereof, hydroxyl amine, lysine and salts thereof; halogen-containing compounds such as hydrogen halogenides, bromosuccinimide, pyridium bromide, and dioxane periodide; acetyl group-containing compounds such as acetyl acetonate; active hydrogen-containing compounds such as active hydrogen-containing compounds such as active hydrogen-containing macronate compounds such as permanganic acid, dichromic acid, chromic acid, selenium dioxide, and ozone which oxide a vinyl double bond; sulfur-containing compounds such as alkali sulfites, ammonium sulfite, and thiosulfuric acid; sulfin-containing compounds such as alkyl or aryl, substituted alkyl or substituted aryl sulfinic acids, or water-soluble salts thereof; diphosphorous acid-containing compounds such as alkali metal salts of diphosphorous acid; sulfur-containing amino acids such as cysteine and water-soluble salts thereof; imidazole derivatives such as L-histitine, 5-amino-4-(aminocarbonyl) imidazole salt, 4-hydroxymethylimidazole hydrochloride, 4-hydroxymethyl-5-methyl imidazole salt, imidazole-4-acetic acid, imidazole-4,5-dicaraboxyamide, 2-isopropylimidazole, 2-methyl-4-nitromidazole, 4-nitroimidazole, 2-ethyl-4-nitroimidazole, 2-ethylimidazole, urocanic acid, and histamine; pyrazole derivatives such as pyrazole and 3,5-dimethylpyrazole; imidazoline derivatives such as 2-imidazoline, 3-imidazoline, and 4-imidazoline; pyrazoline derivatives such as 2-pyrazoline, 3-pyrazoline, and 4-pyrazoline; piperazine derivatives such as piperazine, 1-piperazine ethanol, N-(2-aminoethyl) piperazine, and trans-2,5-dimethyl piperazine; morpholine derivatives such as morpholine, N-(3-aminopropyl) morpholine, morpholine fatty acid; and pyrrole derivatives such as 3-nitropyrrole and 3-aminopyrole may be cited. In this invention, these compounds may be used either singly or in the form of a combination of two or more members. The addition of the compound capable of reacting with an unsaturated double bond results in decreasing the monomer remaining in the HIPE, the porous polymer, or the porous material. Particularly since the porous material occupies a large volume, it is common to compress the porous material and obtain a finished product and as such put to storage. If the monomer continues to remain in the cross-linking polymer or the porous material, the reaction of the monomer proceeds in the product or the polymerization reaction of the monomer proceeds in the compressed product during the course of the storage, with the possible result that the absorption properties of the product will be degraded. Particularly, the polymerization initiator, when suffered to persist, promotes the cross-linking reaction in the product.

(c) Solvent

The addition of the compound capable of reacting with the polymerization initiator and the compound capable of reacting with the unsaturated double bond is facilitated by using these compounds as dissolved in a solvent such as water, alcohol, or acetone which can dissolve these compounds and avoid exerting adverse effects on the quality of the HIPE, porous polymer, and porous material. As concrete examples of the solvent, water, alcohols such as methanol, ethanol, and butanol, and water-soluble solvents such as acetone, ether, and THF may be cited. In this invention, it is particularly favorable to use water in dissolving a compound capable of reacting with a water-soluble polymerization initiator and a compound capable of reacting with an unsaturated double bond. When the compounds selected for the purpose of the addition happen to be capable of reacting oil-soluble reducing agent or unsaturated double bond, it is favorable to use as the solvent an alcohol such as methanol, ethanol, or butanol or a saturated hydrocarbon such as mineral oil, hexane, or heptane, for example.

The concentrations of these compounds in the solutions to be consequently formed do not need to be particularly limited. Generally, they fall preferably in the range of 0.005–20 weight %, more preferably in the range of 0.01–10 weight %, and particularly preferably in the range of 0.01–1 weight %.

(d) Method for Addition

The addition of the compound capable of reacting with the polymerization initiator and/or the compound capable of reacting with the unsaturated double fond in this invention may be effected during the polymerization of the HIPE, during the step for obtaining the porous polymer by the polymerization of the HIPE, during the step for obtaining the porous material by the dehydration of the porous polymer, or during the step performed subsequently thereto. This addition has only to be made at such a stage that at least part of the HIPE may start polymerizing and the porous polymer or the porous material may be infallibly obtained even when the polymerization initiator added in an excess amount is removed. From the viewpoint of the physical properties of the finally obtained porous material, the amounts of the compounds to be added are preferred to be such that the conversion may be not less than 70%, preferably not less than 90%, and more preferably not less than 95%.

The addition of the compound capable of reacting with the polymerization initiator and/or the compound capable of reacting the unsaturated double bond to the HIPE which is in the process of undergoing polymerization may be effected by causing the compounds each in a liquid state, namely the solutions containing the compounds, to be sprayed on the HIPE at the stage at which the monomer in the HIPE is made to undergo the reaction of polymerization as by the application of heat or by immersing the HIPE in the solutions containing the compounds. When the compounds are added inside the polymerization furnace, the method which effects the addition by spraying the relevant compounds proves particularly favorable because it scarcely lowers the temperature of the HIPE.

When the compounds are added after the porous polymer has been obtained, this addition may be attained by spraying the solutions containing the relevant compounds on the HIPE while the porous polymer is still awaiting dehydration and the pores therein are still filled with the prepared water of HIPE or by immersing the HIPE in the solutions. When the compounds are added to the porous polymer in this case, the addition which is made before the porous polymer has been cooled is at an advantage in additionally fulfilling the operation of cooling.

This invention further accomplishes the addition of the compounds to the porous material which has been obtained by dehydrating the porous polymer by spraying the solutions containing the compounds on the porous material or by immersing the porous material in the solutions. Further, the addition of the compounds may be attained similarly on the segments obtained by cutting the porous material in a prescribed shape or on the powder obtained by pulverizing the porous material.

Since the HIPE is transformed by polymerization into a porous polymer and the porous polymer is transformed by dehydration into a porous material, the states acquiring the conversion, 70–100%, in this invention include emulsion, porous polymer, porous material, and what is obtained by slicing the porous material.

In this invention, the addition of the compound capable of reacting with the polymerization initiator and/or the compound capable of reacting with the unsaturated double bond does not need to be limited to the one specific step for the production of a porous material but may be fulfilled at a plurality of steps. The porous polymer which has added a reducing substance, for example, may be subsequently immersed in a solution containing a compound capable of reacting with the unsaturated double bond. The addition of different compounds at different stages as described above proves favorable because the separate compounds are enabled to manifest their respective effects fully satisfactorily.

When the addition of the compound capable of reacting with the unsaturated double bond is made to the HIPE after the converison thereof has reached a level of not less than 90%, preferably not less than 95%, the produced porous material excels in absorption properties.

[VI] Step for Treatment after Formation of Porous Material (Reduction to Finished Product)

(a) Compression

The porous material of this invention can be compressed to a shape one severalth of the original thickness. The shape of a compressed sheet has a small volume as compared with that of the original porous material and, therefore, allows a proportionate decrease in the cost of transportation and storage. The porous material in the compressed shape, on contacting a large amount of water, manifests the nature of absorbing water till reversion to the original thickness and possesses a characteristic property of exhibiting a faster water absorbing speed than the material in the original thickness. From the viewpoint of economizing the space for transportation and storage and facilitating the handling, the compression to not more than ½ and more preferably to not more than ¼ of the original thickness proves effective.

(b) Washing

For the purpose of improving the porous material in the surface condition, the porous material may be washed with purified water, an aqueous solution of an arbitrary additive, or a solvent.

(c) Drying

The porous material which has been obtained in consequence of steps mentioned above, when necessary, may be dried by heating with hot air or microwave or may be adjusted in moisture content by means of a humidifier.

(d) Cutting

The porous material obtained by the steps mentioned above, when necessary, may be cut in proper shape and size and then worked into a finished product which meets the purpose of a varying application.

(e) Impregnation

The porous material may be vested with functionality by being impregnated with a varying additive such as detergent, aromatizer, deodorant, or antibacterial agent.

EXAMPLES

Now, this invention will be described more specifically with reference to working examples of the invention. In the working examples, the performance of a relevant porous polymer was determined and evaluated as follows.

<Determination of Water Content>

A segment, weighing about 10 g, of a given porous material was dried in a reduced pressure at a vacuum oven (made by Tabai and sold under trademark designation of "LHV-122") at 150° C. for two hours. The weights (g) of the segment before and after the drying were accurately weighed. The water content of the sample was calculated by the following formula.

Water Content (%)=100−(Weight after drying/Weight before drying)×100

<Determination of Amount of Residual Polymerization Initiator>

The amount, 15 g, of a given porous material and 1200 g of deionized water added thereto were left standing together for one hour. Thereafter, they were stirred in a homogenizer (made by Tokushu Kika Kogyo K.K. and sold under product code of "DH-L") at 800 rpm for 30 seconds. After the stirring, the resultant mixture was filtered to recover the filtrate.

The amount of the residual polymerization initiator in the filtrate was determined by the method of iodometry.

For a start, 100 g of the filtrate was thrown in an iodine value flask and 0.1 g of potassium iodide was added thereto. Thereafter, the flask was stoppered, given thorough stirring, and then left standing in a cool dark place at 0° C. for 18 hours. After the 18 hours' standing, the flask was taken out of the cool dark place. The filtrate in the flask was titrated in the presence of 2–3 ml of an aqueous 1% starch solution added thereto with 0.01 mol/L sodium thiosulfate till extinction of the purple color (A ml). The amount of the residual polymerization initiator in the filtrate was calculated by the following formula and the weight ppm of the residual polymerization initiator per solids was calculated from the water content of the porous material.

$$\text{Amount of Residual Polymerization Initiator (m.mol)} = A \times 0.01/2$$

<Determination of Amount of Residual Monomer>

One gram of a given porous material cut finely into squares of about 1 mm was stirred till dispersion in 50 g of acetonitrile for one hour. After the stirring, the dispersion was suction filtered through a filter paper of a thickness of 0.2 μm to obtain a filtrate. The filtrate was analyzed by the high-performance liquid chromatography (made by Toso K.K. and sold under the product code of "LC-8020," fitted with a column "ODS-80Ts") using a carrier composed of acetonitrile/deionized water at a ratio of 80/20 and a detector (sold under product code of "UV-8020") under conditions of 1.0 ml/min in rate of flow and 40° C. in temperature to determine the amount of the residual monomer. The amount of the residual monomer, weight %, per solid component was calculated from the water content of the porous material. The conversion was calculated in accordance with the following formula.

$$\text{Conversion (\%)} = 100 - \text{residual monomer (\%)}$$

<Determination of Absorbent Capacity and Evaluation of Stability in Storage>

Immediately after production and after one month's standing at rest at 60° C., a given porous material was tested for absorbent capacity to evaluate stability in storage.

From a given porous material immediately after production, two one g test pieces were cut. One of the test pieces was tightly sealed in a polyethylene bag and left standing at rest in a drying device at 60° C. for one month.

The other test piece was left immersed in deionized water at 25° C. for one hour. After the immersion, the test piece was taken out and measured for weight. The same procedure was carried out on other samples which had been left standing at 60° C. for one month.

The absorbent capacity was calculated according to the following formula.

$$\text{Absorbent capacity} = \{(\text{Weight of porous material after immersion in deionized water})/(\text{Weight of porous material before immersion in deionized water}) - 1\}/\{1 - (\text{Water content of porous material}/100)\}$$

Subsequently, the stability of a given porous material in storage was evaluated based on the absorbent capacity immediately after production and the absorbent capacity after one month's standing at rest for 60° C.

Stability in storage=absorbent capacity after one month's standing at rest at 60° C./absorbent capacity immediately after production Production Example 1

An oil phase mixture solution (hereinafter referred to as "oil phase") was prepared by homogeneously dissolving a monomer component formed of 5.1 parts by weight (hereinafter referred to simply as "parts") of 2-ethylhexyl acrylate, 3.1 parts of 42% divinyl benzene (p-ethyl-vinyl benzene as other moiety), and 1.1 parts of 1,6-hexane diol diacrylate and a surfactant formed of 0.6 part of glycerin monooleate and 0.1 part of ditallow dimethyl ammonium methyl sulfate. Meanwhile, a water phase aqueous solution (hereinafter referred to as "water phase") was prepared by dissolving 18 parts of calcium chloride in 425 parts of deionized water and then heated to 95° C. The oil phase and the water phase were continuously supplied at the ratio indicated above into an stirring mixer intended as an emulsifying device to attain continuous formation of HIPE. The ratio of the water phase and the oil phase was 44.3/1.

The HIPE thus obtained was continuously extracted from the agitating mixer. To a static mixer equipped in the periphery thereof with a heating and an insulating member and heated in advance to 95° C., the extracted HIPE was delivered and a liquid separately prepared by dissolving 0.5 part of sodium persulfate as a polymerization initiator in 6 parts of deionized water was forwarded to mix the HIPE with the polymerization initiator continuously. The final ratio of the water phase and the oil phase was 45/1.

This HIPE was formed continuously a sheet measuring about 50 cm and about 5 mm in thickness by passing through a flexible tube provided in the periphery thereof with a heating and an insulating member and heated in advance to 95° C. and casting onto a running belt disposed horizontally and driven at a rate of 1.2 m/min and heated at 95° C. The sheet of HIPE was subsequently passed through a polymerization zone controlled at a polymerization temperature of 95° C. over a period of 10 minutes and then subjected to dehydration by compression to obtain a porous material (1). The porous material (1) was found to have a water content of 67 weight %, an amount of residual polymerization initiator of 770 ppm, a conversion of 99 (%), and an amount of residual monomer of 330 (ppm).

Example 1

A segment, 10 g, was cut from the porous material (1) and one g of an aqueous 0.2 weight % solution of sodium L-ascorbate was sprayed onto the segment. The sprayed segment was air dried at a temperature of 25° C. and a relative humidity of 40% for 16 hours to obtain a porous material (2). The porous material (2) was found to have a water content of 19 weight %, an amount of residual polymerization initiator of 5.5 ppm, a conversion of 99 (%), and an amount of residual monomer of 150 (ppm). The porous materials produced in the following working examples and comparative examples were tested for absorbent capacity and stability in storage immediately after production and one month thereafter. The results are shown in Table 1.

Example 2

A porous material (3) was obtained by following the procedure of Example 1 while using hot air at 130° C. for two minutes in air drying the segment wetted by spraying one g of an aqueous 0.2 weight % solution of sodium L-ascorbate. The porous material (3) was found to have a water content of 18 weight %, no detectable amount of residual polymerization initiator, a conversion of 99 (%), and an amount of residual monomer of 140 (ppm).

Example 3

A porous material (4) was obtained by following the procedure of Example 1 while using hot air at 90° C. for three minutes in air drying the segment wetted by spraying one g of an aqueous 0.2 weight % solution of sodium L-ascorbate. The porous material (4) was found to have a water content of 21 weight %, no detectable amount of residual polymerization initiator, a conversion of 99 (%), and an amount of residual monomer of 170 (ppm).

Example 4

A porous material (5) was obtained by following the procedure of Example 1 while changing the aqueous 0.2 weight % solution of sodium L-ascorbate to an aqueous 0.2 weight % solution of sodium erysorbate. The porous material (5) was found to have a water content of 20 weight %, no detectable amount of residual polymerization initiator, a conversion of 99 (%), and an amount of residual monomer of 120 (ppm).

Example 5

A porous material (6) was obtained by following the procedure of Example 4 while using hot air at 130° C. for two minutes in air drying the segment wetted by spraying one g of an aqueous 0.2 weight % solution of sodium erysorbate. The porous material (6) was found to have a water content of 19 weight %, no detectable amount of residual polymerization initiator, a conversion of 99 (%), and an amount of residual monomer of 150 (ppm).

Example 6

A porous material (7) was obtained by following the procedure of Example 5 while changing the aqueous 0.2 weight % solution of sodium erysorbate to an aqueous 0.1 weight % solution of sodium hydrogen sulfite. The porous material (7) was found to have a water content of 20 weight %, no detectable amount of residual polymerization initiator, a conversion of 99 (%), and an amount of residual monomer of 70 (ppm).

Example 7

An oil phase mixture solution was prepared by homogeneously dissolving a monomer component formed of 5.1 parts of 2-ethylhexyl acrylate, 3.1 parts of 42% divinyl benzene (p-ethyl-vinyl benzene as other moiety), and 1.1 parts of 1,6-hexane diol diacrylate and a surfactant formed of 0.6 part of glycerin monooleate and 0.1 part of ditallow dimethyl ammonium methyl sulfate. Meanwhile, a water phase aqueous solution was prepared by dissolving 18 parts of calcium chloride in 425 parts of deionized water and then heated to 95° C. The oil phase and the water phase were continuously supplied at the ratio indicated above into an agitating mixer intended as an emulsifying device to form an HIPE continuously. The ratio of the water phase and the oil phase was 44.3/1.

The HIPE thus obtained was continuously extracted from the agitating mixer. To a static mixer equipped in the periphery thereof with a heating and an insulating member and heated in advance to 95° C., the extracted HIPE was delivered and a liquid separately prepared by dissolving 0.5 part of sodium persulfate as a polymerization initiator in 6 parts of deionized water was forwarded to mix the HIPE with the polymerization initiator continuously. The final ratio of the water phase and the oil phase was 45/1.

This HIPE was formed continuously a sheet measuring about 50 cm and about 5 mm in thickness by passing through a flexible tube provided in the periphery thereof with a heating and an insulating member and heated in advance to 95° C. and casting onto a running belt disposed horizontally and driven at a rate of 1.2 m/min and heated at 95° C. to effect continuous formation of. The sheet of HIPE was subsequently passed through a polymerization zone controlled at a polymerization temperature of 95° C. over a period of 10 minutes and then an aqueous 5.8 weight % solution of sodium L-ascorbate was continuously sprayed onto the sheet of HIPE in an atmosphere of 95° C. The sheet after one minute's continuous spraying was dehydrated by compression to obtain a porous material (8). The porous material (8) was found to have a water content of 69%, no detectable amount of residual polymerization initiator, a conversion of 99 (%), and an amount of residual monomer of 120 (ppm).

Example 8

A porous material (9) was obtained by following the procedure of Example 7 while changing the amount of the aqueous 5.8 weight % solution of sodium L-ascorbate to be sprayed continuously from 100 g/minute to 50 g/minute. The porous material (9) was found to have a water content of 68%, an amount of residual polymerization initiator of 25 ppm, a conversion of 99 (%), and an amount of residual monomer of 150 (ppm).

Example 9

A porous material (10) was obtained by air drying the porous material (9) at a temperature of 25° C. and a relative humidity of 40% for 16 hours. The porous material (10) was found to have a water content of 18%, no detectable amount of residual polymerization initiator, a conversion of 99 (%), and an amount of residual monomer of 110 (ppm).

Example 10

A porous material (11) was obtained by air drying the porous material (9) at 120° C. for three minutes. The porous material (11) was found to have a water content of 15%, no detectable amount of residual polymerization initiator, a conversion of 99 (%), and an amount of residual monomer of 100 (ppm).

Example 11

An oil phase mixture solution was prepared by homogeneously dissolving a monomer component formed of 5.1 parts of 2-ethylhexyl acrylate, 3.1 parts of 42% divinyl benzene (p-ethyl-vinyl benzene as other moiety), and 1.1 parts of 1,6-hexane diol diacrylate and a surfactant formed of 0.6 part of glycerin monooleate and 0.1 part of ditallow dimethyl ammonium methyl sulfate. Meanwhile, a water phase aqueous solution was prepared by dissolving 18 parts of calcium chloride in 425 parts of deionized water and then heated to 95° C. The oil phase and the water phase were continuously supplied at the ratio indicated above into an agitating mixer intended as an emulsifying device to obtain continuous formation of HIPE. The ratio of the water phase and the oil phase was 44.3/1. The HIPE thus obtained was continuously extracted from the agitating mixer. To a static mixer provided in the periphery thereof with a heating and an insulating member and heated in advance to 95° C., the extracted HIPE was delivered and a liquid separately prepared by dissolving 0.5 part of sodium persulfate as a polymerization initiator in 6 parts of deionized water was forwarded to mix the HIPE with the polymerization initiator continuously. The final ratio of the water phase and the oil phase was 45/1.

This HIPE was formed continuously a sheet measuring about 50 cm and about 5 mm in thickness by passing through a flexible tube provided in the periphery thereof with a heating and an insulating member and heated in advance to 95° C. and casting onto a running belt disposed horizontally and driven at a rate of 1.2 m/min and heat at 95° C. The sheet of HIPE was subsequently passed through a polymerization zone controlled at a polymerization temperature of 95° C. At the point which the HIPE on the belt passed five minutes after the entry of the HIPE into the polymerization zone, an aqueous 3.0 weight % solution of sodium hydrogen sulfite was continuously sprayed onto the HIPE in the polymerization zone at a rate of 100 g/min. Immediately after the elapse of five minutes spent by the HIPE in passing through the polymerization zone, the conversion was 93% and the amount of residual polymerization initiator was 980 ppm. After the HIPE was passed through the polymerization zone for five more minutes subsequently to the spraying, it was dehydrated by compression to obtain a porous material (12).

The porous material (12) was found to have a water content of 71 weight %, no detectable amount of residual polymerization initiator, a conversion of 99 (%), and an amount of residual monomer of 60 (ppm).

Comparative Example 1

A comparative porous material (1) was obtained by air drying the porous material (1) at a temperature of 25° C. and a relataive humidity of 40% for 16 hours. The comparative porous material (1) was found to have a water content of 21%, an amount of residual polymerization initiator of 750 ppm, a conversion of 99 (%), and an amount of residual monomer of 320 (ppm).

Comparative Example 2

A comparative porous material (2) was obtained by air drying the porous material (1) at 120° C. for three minutes. The comparative porous material (2) was found to have a water content of 18%, an amount of residual polymerization initiator of 380 ppm, a conversion of 99(%), and an amount of residual monomer of 280 (ppm).

Comparative Example 3

A comparative porous material (3) was obtained by air drying the porous material (1) at 150° C. for one minute. The comparative porous material (3) was found to have a water content of 14%, an amount of residual polymerization initiator of 230 ppm, a conversion of 99 (%), and an amount of residual monomer of 270 (ppm).

Comparative Example 4

An oil phase mixture solution was prepared by homogeneously dissolving a monomer component formed of 5.1 parts of 2-ethylhexyl acrylate, 3.1 parts of 42% divinyl benzene (p-ethyl-vinyl benzene as other moiety), and 1.1 parts of 1,6-hexane diol diacrylate and a surfactant formed of 0.6 part of glycerin monooleate and 0.1 part of ditallow dimethyl ammonium methyl sulfate. Meanwhile, a water phase aqueous solution was prepared by dissolving 18 parts of calcium chloride in 425 parts of deionized water and then heated to 95° C. The oil phase and the water phase were continuously supplied at the ratio indicated above into an agitating mixer intended as an emulsifying device to attain continuous formation of HIPE. The ratio of the water phase and the oil phase was 44.3/1. The HIPE thus obtained was continuously extracted from the agitating mixer. To a static mixer provided in the periphery thereof with a heating and an insulating member and heated in advance to 95° C., the extracted HIPE was delivered and a liquid separately prepared by dissolving 0.5 part of sodium persulfate as a polymerization initiator in 6 parts of deionized water was forwarded to mix the HIPE with the polymerization initiator. The final ratio of the water phase and the oil phase was 45/1.

This HIPE was formed continuously a sheet measuring about 50 cm and about 5 mm in thickness by passing through a flexible tube provided in the periphery thereof with a heating and an insulating member and heated in advance to 95° C. and, casting onto a running belt disposed horizontally and driven at a rate of 1.2 m/min. and heated at 95° C. Immediately after the formation of this sheet of HIPE, an aqueous 10 weight % solution of sodium hydrogen sulfite was continuously sprayed on the sheet at a rate of 100 g/min. Immediately after the formation, the HIPE had a conversion of 37%. The sheet of HIPE was subsequently passed through a polymerization zone controlled at a polymerization temperature of 95° C. over a period of 10 minutes. The HIPE which had passed through the polymerization zone had a conversion of 70%. It could not produce a porous material because it was not sufficiently cured. Thus, the sheet could not be tested for water content, amount of residual polymerization initiator, amount of residual monomer, or absorbent capacity.

TABLE 1

| | | Water Cont. (%) | Polymerization Ratio (%) | Residual Initiator (ppm) | Residual Monomer (ppm) | Absorbent capacity (g/g) | | | Speed of absorption (second) | |
|---|---|---|---|---|---|---|---|---|---|---|
| | | | | | | Immediately after Production (X) | After 1 month (Y) | (Y)/(X) | Immediately after Production | After 1 month |
| Ref. 1 | POROUS MATERIAL (1) | 67 | 99 | 770 | 330 | 43.9 | 30.8 | 0.70 | 20 | 60 |
| EX. 1 | POROUS MATERIAL(2) | 19 | 99 | 5.5 | 150 | 43.2 | 42.9 | 0.99 | 20 | 30 |
| EX. 2 | POROUS MATERIAL(3) | 18 | 99 | N.D. | 140 | 42.9 | 42.1 | 0.98 | 20 | 30 |
| EX. 3 | POROUS MATERIAL(4) | 21 | 99 | N.D. | 170 | 43.3 | 41.9 | 0.97 | 20 | 20 |
| EX. 4 | POROUS MATERIAL(5) | 20 | 99 | N.D. | 120 | 41.8 | 40.6 | 0.97 | 20 | 20 |
| EX. 5 | POROUS MATERIAL(6) | 19 | 99 | N.D. | 150 | 41.7 | 40.5 | 0.97 | 20 | 20 |

TABLE 1-continued

|  |  | Water Cont. (%) | Polymerization Ratio (%) | Residual Initiator (ppm) | Residual Monomer (ppm) | Absorbent capacity (g/g) | | | Speed of absorption (second) | |
|---|---|---|---|---|---|---|---|---|---|---|
|  |  |  |  |  |  | Immediately after Production (X) | After 1 month (Y) | (Y)/(X) | Immediately after Production | After 1 month |
| EX. 6 | POROUS MATERIAL(7) | 20 | 99 | N.D. | 70 | 42.5 | 39.9 | 0.94 | 20 | 20 |
| EX. 7 | POROUS MATERIAL(8) | 69 | 99 | N.D. | 120 | 43.8 | 42.1 | 0.96 | 20 | 20 |
| EX. 8 | POROUS MATERIAL(9) | 68 | 99 | 25 | 150 | 43.8 | 42.1 | 0.96 | 20 | 30 |
| EX. 9 | POROUS MATERIAL(10) | 18 | 99 | N.D. | 110 | 42.2 | 39.5 | 0.94 | 20 | 20 |
| EX. 10 | POROUS MATERIAL(11) | 15 | 99 | N.D. | 100 | 41.9 | 38.9 | 0.93 | 20 | 20 |
| EX. 11 | POROUS MATERIAL(12) | 71 | 99 | N.D. | 60 |  |  |  | 20 | 20 |
| Cont. 1 | Cont. POROUS MATERIAL(1) | 21 | 99 | 750 | 320 | 42.5 | 29.8 | 0.70 | 20 | 120 |
| Cont. 2 | Cont. POROUS MATERIAL(2) | 18 | 99 | 380 | 280 | 41.9 | 33.1 | 0.79 | 20 | 60 |
| Cont. 3 | Cont. POROUS MATERIAL(3) | 14 | 99 | 230 | 270 | 40.8 | 33.6 | 0.82 | 20 | 50 |
| Cont. 4 | — |  | 70 | — | — | — | — | — | — | — |

INDUSTRIAL APPLICABILITY

In accordance with this invention, in producing a porous material by polymerizing HIPE it is made possible to produce a porous material capable of maintaining the performance stably for a long time and excellent in stability as well by adding a compound capable of reacting with a polymerization initiator and/or a compound capable of reacting with an unsaturated double bond at the step of polymerization.

What is claimed is:

1. A method for the production of a porous polymer or a porous material made thereof comprising a step of polymerizing a water-in-oil type high internal phase emulsion containing a polymerizable monomer to obtain a porous polymer, and a step of adding to said porous polymer or a porous material made thereof, after the polymerizing step, a first compound capable of reacting with a polymerization initiator, a second compound capable of reacting with an unsaturated double bond, or both, said porous polymer and/or said porous material having a polymerization conversion of not less than 70%.

2. A method according to claim 1, wherein said first compound is a reducing substance.

3. A method according to claim 1, wherein said addition is conducted by spraying said first compound, said second compound, or both in a liquid state onto said porous polymer or said porous material.

4. A method according to claim 1, wherein said addition is conducted by immersing said porous polymer or said porous material in a solution containing said first compound, said second compound, or both.

5. A method according to claim 1, wherein preparation of the porous material includes dehydrating the porous polymer, and formation of the water-in-oil type emulsion, the polymerization, and the dehydration are carried out continuously.

6. A method according to claim 2, wherein said addition is conducted by spraying said first compound, said second compound, or both in a liquid state onto said porous polymer or said porous material.

7. A method according to claim 2, wherein said addition is conducted by immersing said porous polymer or said porous material in a solution containing said first compound, said second compound, or both.

8. A method according to claim 2, wherein preparation of the porous material includes dehydrating the porous polymer, formation of the water-in-oil type emulsion, the polymerization, and the dehydration are carried out continuously.

9. A method according to claim 3, wherein preparation of the porous material includes dehydrating the porous polymer, formation of the water-in-oil type emulsion, the polymerization, and the dehydration are carried out continuously.

10. A method according to claim 4, wherein preparation of the porous material includes dehydrating the porous polymer, formation of the water-in-oil type emulsion, the polymerization, and the dehydration are carried out continuously.

11. A method for the production of a porous material comprising a step of polymerizing a water-in-oil type high internal phase emulsion containing a polymerizable monomer to obtain a porous polymer, in which a first compound capable of reacting with a polymerization initiator, a second compound capable of reacting with an unsaturated double bond, or both are added to said emulsion, when said emulsion has a conversion of no less than 70%.

12. A method according to claim 11, wherein said first compound is a reducing substance.

13. A method according to claim 11, wherein said addition is conducted by spraying said first compound capable, said second compound, or both in a liquid state onto said emulsion.

14. A method according to claim 11, wherein said addition is conducted by immersing said emulsion in a solution containing said first compound, said second compound, or both.

15. A method according to claim 11, wherein preparation of the porous material includes dehydrating the porous polymer, and formation of the water-in-oil type emulsion, the polymerization, and the dehydration are carried out continuously.

* * * * *